A. C. HUCKELBRIDGE.
VEHICLE WHEEL.
APPLICATION FILED FEB. 8, 1911.
1,006,219.
Patented Oct. 17, 1911.
2 SHEETS—SHEET 1.
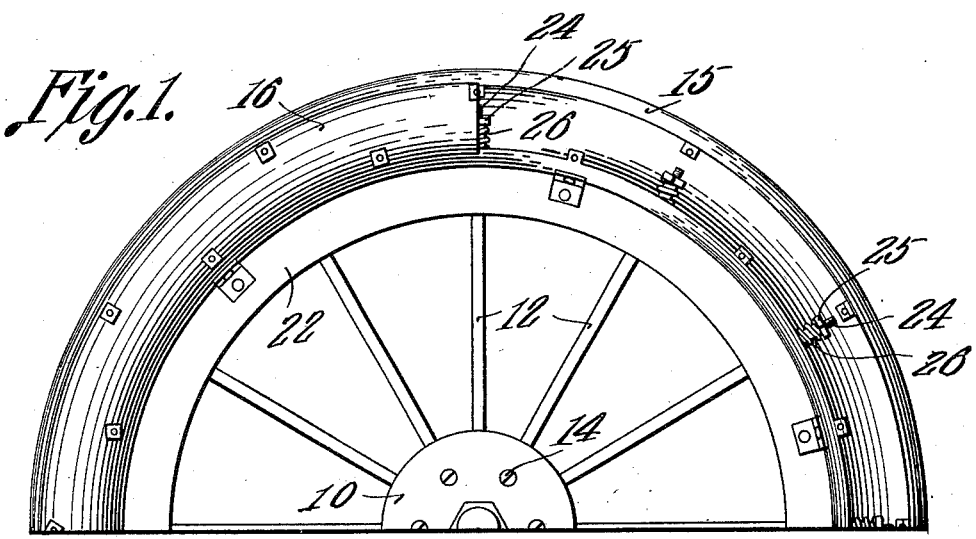
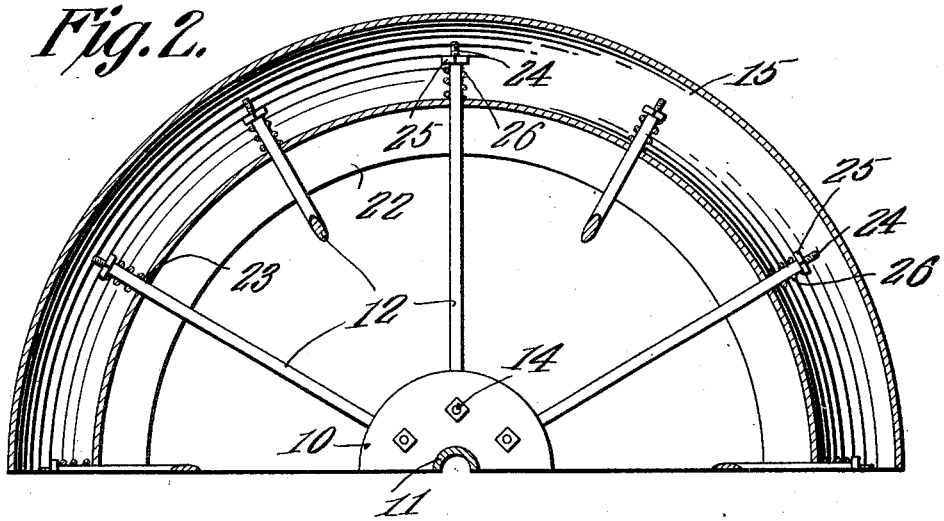
Witnesses
Authur C. Huckelbridge,
Inventor
by C. A. Snow & Co.
Attorneys A. C. HUCKELBRIDGE.
VEHICLE WHEEL.
APPLICATION FILED FEB. 8, 1911.
1,006,219.
Patented Oct. 17, 1911.
2 SHEETS—SHEET 2.
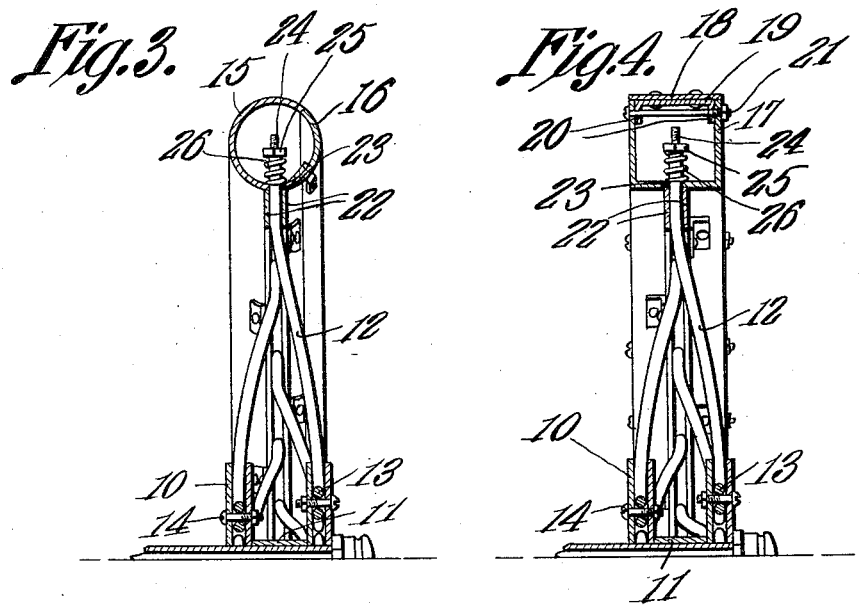
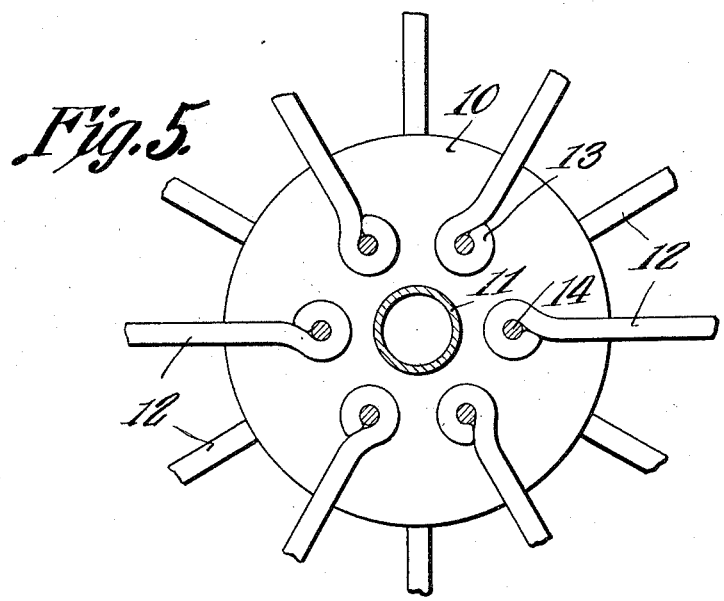
Witnesses
Arthur C. Huckelbridge,
Inventor
by C. A. Snow & Co.
Attorneys

UNITED STATES PATENT OFFICE.

ARTHUR C. HUCKELBRIDGE, OF COLDWATER, KANSAS.

VEHICLE-WHEEL.

1,006,219.            Specification of Letters Patent.     Patented Oct. 17, 1911.

Application filed February 8, 1911. Serial No. 607,353.

*To all whom it may concern:*

Be it known that I, ARTHUR C. HUCKELBRIDGE, a citizen of the United States, residing at Coldwater, in the county of Comanche and State of Kansas, have invented a new and useful Vehicle-Wheel, of which the following is a specification.

It is the object of the present invention to provide an improved vehicle wheel of the spring type and the invention aims primarily to provide, in a wheel including spokes which project into a hollow rim and tire and carry at their projecting end, cushioning springs housed within the rim, flanges upon the rim between which the spokes are confined, for the purpose of strengthening the connection of the spokes with the rim.

A further feature of the invention resides in the novel form of hub constituting a part of the wheel.

In the accompanying drawings:—Figure 1 is a view in side elevation, partly broken away, of a portion of a wheel constructed in accordance with the present invention. Fig. 2 is a vertical sectional view therethrough on a line from front to rear. Fig. 3 is a vertical transverse sectional view through a portion of the wheel. Fig. 4 is a similar view illustrating a slight modification of the invention. Fig. 5 is a detail vertical sectional view through the hub of the wheel.

In the drawings, the wheel is illustrated as including, in the construction of its hub, spaced pairs of hub plates 10. These hub plates are formed within alined openings with which register the ends of a sleeve 11 fitted between the inner plates of the two pairs. The spokes of the wheel are indicated by the numeral 12 and at their inner ends are formed with eyes 13, the alternate ones of the spokes being arranged at their inner end between the plates 10 of one pair and the other spokes being arranged at their inner ends between the plates of the other pair. Bolts 14 are secured through the hub plates 10 of each pair and through the eyes of the spokes associated therewith and serve to connect the spokes with the hub of the wheel.

The combined rim and tire of the wheel is hollow and may either be of the form shown in Fig. 3 of the drawing or of the form shown in Fig. 4. In the former instance, it is circular in cross section, consisting of a major section 15 and a section 16 which is assembled therewith, the section 16 being removable for the purpose of properly adjusting the inner ends of the spokes with relation to the rim, in a manner to be presently explained. In Fig. 4 of the drawings, the rim is illustrated as rectangular in cross section, consisting of a major section 17 and a section 18 which is fitted and secured thereto and constitutes the tread of the rim. In securing the section 18 to the section 17, a number of attaching brackets 19 are secured upon the inner side of the section 18 at suitable intervals and include ears 20 which fit between the side walls of the section 17, there being bolts 21 secured through the said side walls of the said section 17 and through the said ears 20.

Whether the rim be of the form shown in Fig. 3 or of the form shown in Fig. 4, it is formed upon its inner side with spaced annular flanges 22 and at intervals between these flanges with openings 23. The outer ends of the spokes 12 project between the flanges 22 and through the openings 23 and into the hollow rim. The openings 23 are of slightly greater diameter than the spokes at their said outer ends whereby the spokes may have a certain degree of play in the openings. The outer extremities of the spokes are threaded as at 24 and a nut 25 is fitted upon each spoke and bears against a cushioning spring 26 fitted thereon and housed within the hollow rim. From the foregoing description of the invention it will be readily understood that as a wheel travels over a road surface, the cushioning springs 26 which are uppermost, will be compressed by the downward movement of the relative spokes 12. Thus, the movement of the wheel over the surface is cushioned. It will be readily understood, further, that by removing the section 16, in the instance of the form of the invention shown in Fig. 3 of the drawings, or the section 18 in the instance of the form of the invention shown in Fig. 4 of the drawings, the nuts 25 may be loosened or tightened whereby to vary the tension of the springs 26.

What is claimed is:—

In a wheel, a combined rim and tire formed circular in cross section, said rim being formed in two co-acting sections, one of said sections being of lesser size in cross section than the other section, means for attaching the lesser section to the larger section to permit access to the interior of the rim, a pair of flanges formed integral with the larger rim section and projecting annularly and inwardly therefrom, said larger rim section between the flanges being provided with a series of equi-distantly disposed apertures communicating with the interior of the rim, a hub, spokes radiating from the hub and projecting at their outer ends between the flanges and through the apertures into the casing formed by the rim, springs mounted upon the outer ends of the spokes and housed within the rim, and a nut carried upon the outer end of each spoke for retaining the springs upon the spokes.

In testimony that I claim the foregoing as my own, I have hereto affixed my signature in the presence of two witnesses.

ARTHUR C. HUCKELBRIDGE.

Witnesses:
M. SCHAUB,
NELLIE BOTTS.

Copies of this patent may be obtained for five cents each, by addressing the "Commissioner of Patents, Washington, D. C."